(12) United States Patent
Abdo et al.

(10) Patent No.: US 7,483,898 B2
(45) Date of Patent: Jan. 27, 2009

(54) SYSTEM AND METHOD FOR AUDITING A NETWORK

(75) Inventors: Ralph Abdo, Sammamish, WA (US); John Wu, Seattle, WA (US); Vincent Chang, Sammamish, WA (US); Theodore L. Michel, Bellevue, WA (US); Thad Schwebke, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 10/867,198

(22) Filed: Jun. 14, 2004

(65) Prior Publication Data

US 2005/0278342 A1 Dec. 15, 2005

(51) Int. Cl.
*G06F 7/00* (2006.01)
*G06F 17/30* (2006.01)

(52) U.S. Cl. .......................... 707/10; 707/204
(58) Field of Classification Search ............. 707/10, 707/204, 202, 201; 709/203; 395/650
See application file for complete search history.

(56) References Cited

U.S. PATENT DOCUMENTS

| | | | | |
|---|---|---|---|---|
| 4,658,351 | A | * | 4/1987 | Teng .......................... 718/103 |
| 5,414,845 | A | * | 5/1995 | Behm et al. ................. 718/104 |
| 6,640,223 | B1 | | 10/2003 | Jones et al. ..................... 707/3 |
| 2002/0099829 | A1 | * | 7/2002 | Richards et al. ............. 709/227 |
| 2003/0187920 | A1 | * | 10/2003 | Redkar ........................ 709/203 |

OTHER PUBLICATIONS

Ichiro Satoh "Reusable Mobile Agents for Cluster Computing" *IEEE* 2003 (12 pages).
"IBM Tivoli Configuration Manager—Introducing IBM Tivoli Configuration Manager", Oct. 2002, retrieved from http://publib.boulder.ibm.com/tividd/td/ITCM/GC23-4703-00/en_US/PDF/GC23-4703-00.pdf.
"IBM Tivoli Configuration Manager—User's guide for deployment Services", Oct. 2002, http://publib.boulder.ibm.com/tividd/td/ITCM/SC23-4710-00/en_US/PDF/ds42mst.pdf.

* cited by examiner

*Primary Examiner*—Charles Rones
*Assistant Examiner*—Fariborz Khoshnoodi
(74) *Attorney, Agent, or Firm*—Merchant & Gould; Ryan T. Grace

(57) ABSTRACT

A network is audited by running task programs and evaluating the results of the task programs. Task programs are tools that are configured to retrieve information about a particular network device. A service is arranged to coordinate the scheduling, execution, and data collection and aggregation of each task program over disparate networks such as multiple domains. Each task program executes at a scheduled time and provides results to a parser. The parser formats the results and provides the formatted data to the service. The service stores the collected data in a database. A client can schedule and/or review the results of audits by communicating with the service. The collected data can be compared and filtered according to rule-based templates that define acceptable network device configurations. Reports can be generated based on the templates such that a client can evaluate results from task programs executed over the entire network.

16 Claims, 7 Drawing Sheets

SYSTEM AND METHOD FOR AUDITING A NETWORK

BACKGROUND OF THE INVENTION

A computer network may encompass a large variety of different computing devices linked together across different domains. As the network changes, specific information about the network or a particular computing device on the network may be difficult to obtain. For example, an administrator may desire to determine the software installed on the computing devices comprising the network, the version of the installed software, or the configuration of devices on the network. In a conventional system, network device information may be obtained by using a network auditing application that collects specific data for a single domain. The conventional method for auditing devices on a network is inefficient because the data is collected for only one domain, and each network auditing application is designed for the specific information that is collected.

SUMMARY OF THE INVENTION

A network is audited by running task programs and evaluating the results of the task programs. Task programs are tools that are configured to retrieve information about a particular network device. A service is arranged to coordinate the scheduling, execution, and data collection and aggregation of each task program over disparate networks such as multiple domains. Each task program executes at a scheduled time and provides results to a parser. The results may be in various formats to allow for flexibility in choosing task programs. The parser formats the results and provides the formatted data to the service. The service stores the collected data in a database. A client can schedule and/or review the results of audits by communicating with the service. The collected data can be compared and filtered according to rule-based templates that define acceptable device configurations. Reports can be generated based on the templates such that a client can evaluate results from task programs executed over the entire network.

According to one aspect, a system is arranged to schedule the execution of tasks in response to requests that are submitted by a client. The tasks may be scheduled for execution across disparate networks. An interface is configured to receives the requests that are provided by the client and submit the requests to a service. The service is arranged in cooperation with a scheduler database to store and retrieve each submitted request. The scheduler is configured to poll the service for requests, schedule the execution time of the requests, execute the requests, and report the status of the requests.

DETAILED DESCRIPTION OF THE PREFERRED EMBODIMENT

Briefly described, a network is audited by running task programs and evaluating the results of the task programs. Task programs are tools that are configured to retrieve information about a particular network device. A service is arranged to coordinate the scheduling, execution, and data collection and aggregation of each task program over disparate networks such as multiple domains. Each task program executes at a scheduled time and provides results to a parser. The results may be in various formats to allow for flexibility in choosing task programs. The parser formats the results and provides the formatted data to the service. The service stores the collected data in a database. A client can schedule and/or review the results of audits by communicating with the service. The collected data can be compared and filtered according to rule-based templates that define acceptable server configurations. Reports can be generated based on the templates such that a client can evaluate results from task programs executed over the entire network.

Illustrative Operating Environment

Figure 1:
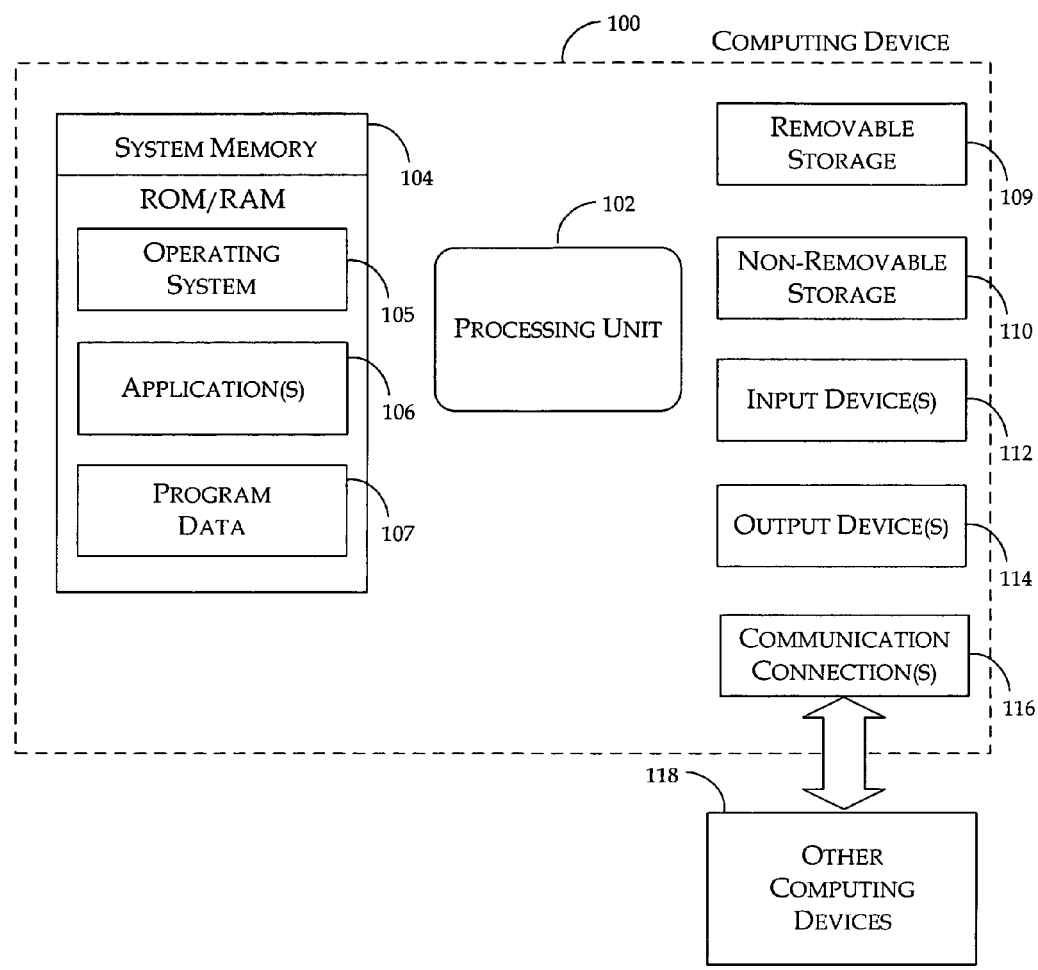
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. The present invention, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Scheduling the Execution of Applications

Figure 2:
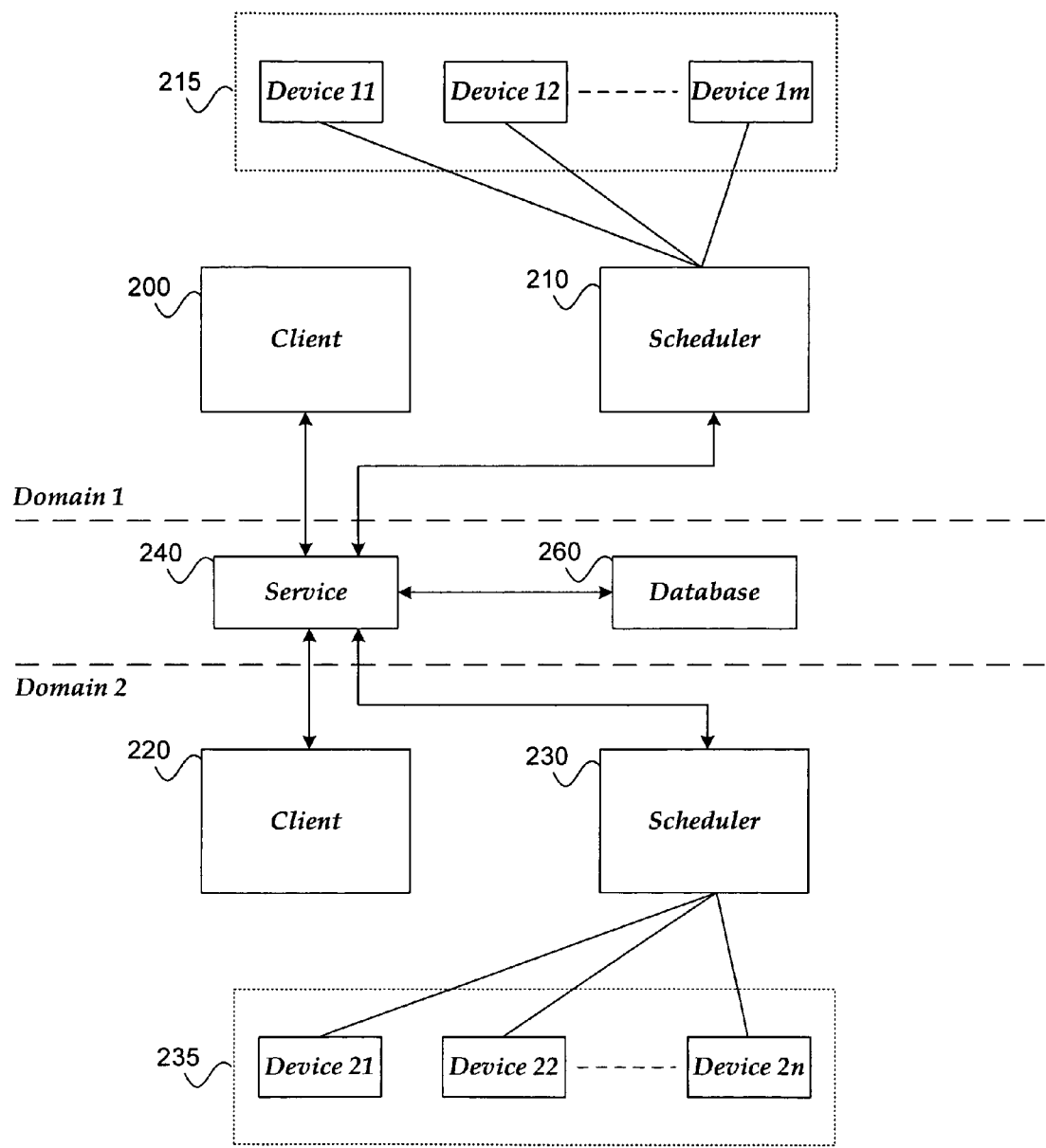
FIG. 2 is functional block diagram illustrating a system for auditing the status of a network, in accordance with the present invention.

FIG. 2 is functional block diagram illustrating a system for auditing the status of a network. The system includes client 200 and scheduler 210 in a first domain (i.e., domain 1), client 220 and scheduler 230 in a second domain (i.e., domain 2), service 240 (e.g., web service), and database 260. Domain 1 and domain 2 each include a scheduler and a client such that data associated with application execution may be collected from each domain.

Clients (e.g., clients 200 and 220) can request the execution of an application at a scheduled time through service 240. In one embodiment, the application is a task program. The task program may be related to a software audit, deployment of software, a software patch/update, account permission settings, hardware audits, etc. The requested data is collected during execution of the task program. The request is communicated to service 240.

Each client may correspond to: a client device that is located inside the corresponding portion of the network (e.g., in the same domain) where the application program resides, a client device that is located in another portion of the network (e.g., in a different domain) different from where the application program resides, or some other client device that is located outside of the network and arranged to communicate with the service 240. For example, service 240 may be a web service that provides client 200 access over a computing network such as the Internet.

Service 240 communicates with database 260. Service 240 receives requests from scheduler 210 (or 230) to access database 260 and determine if unprocessed job requests have been submitted by client 200 and 220. If the client request involves tasks in both domains, two jobs are created in database 260. Service 240 returns the job that belongs to the same domain as scheduler 210 (or 230).

Scheduler 210 polls service 240 for requests. When a request is retrieved by scheduler 210, the corresponding application program is scheduled for execution at an appointed time. Scheduler 210 initiates execution of the corresponding task program when the appointed time is reached. In one embodiment, a user may cancel a request before the appointed time of execution. In one example, scheduler 210 is scheduled to audit multiple (n) devices (215) that are located within a particular portion of the network (e.g., domain 1) with the scheduled execution of the task program. Scheduler 210 is arranged to trigger a parser (not shown) to collect the data from the output of the application program when execution of the corresponding task program is complete. The parser then processes the output for communication with service 240.

Scheduler 230 also polls service 240 for requests. When a request is received by scheduler 230, the corresponding application program is scheduled for execution at an appointed time. Scheduler 230 initiates execution of the corresponding task program when the appointed time is reached. In one example, scheduler 230 is scheduled to audit multiple (m) devices (235) that are located within another particular portion of the network (e.g., domain 2) with the scheduled execution of the task program. Scheduler 230 is arranged to trigger a parser to collect the data from the output of the application program when execution of the corresponding task program is complete. The parser then processes the output for communication with service 240.

Service 240 is arranged to receive collected data from each of the schedulers (e.g., 210 and 230). In one example, scheduler 210 (or 230) is configured to send results to service 240. In another example, service 240 is configured to receive and process messages including results from the schedulers. After service 240 receives and processes data from the various schedulers, service 240 stores the results in database 260.

Each device in the network may be serviced by a particular scheduler. For example, device 11 is serviced by scheduler 210. The devices may include servers, routers, switches, clients, or any other hardware that exists on a network. In one example, the devices (e.g., devices 215) are part of a server farm such as content servers in a network.

Figure 3:
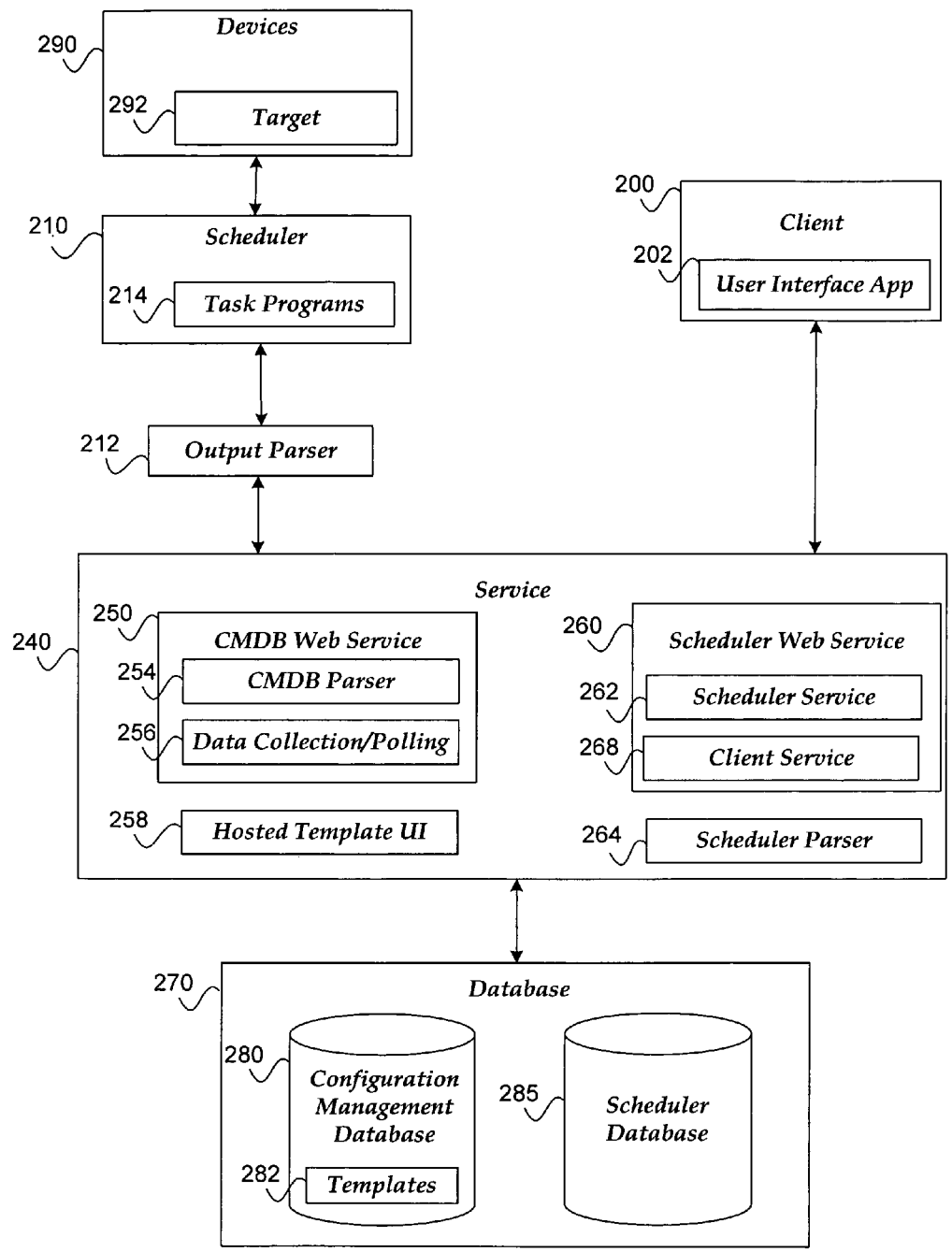
FIG. 3 is functional block diagram illustrating a system for auditing the status of a network, in accordance with the present invention.

FIG. 3 is a functional block diagram illustrating a system for auditing the status of a network. Client 200 includes user interface application 202. Scheduler 210 includes task programs 214. Output parser 212 communicates with service 240 and scheduler 210. Scheduler 210 communicates with devices 290. Devices 290 includes target 292 which is in communication with task programs 214 to collect data associated with each task program 214 on scheduler 210. Target 292 may correspond to a single or group of devices, clients, servers, routers, switches, or network nodes.

Service 240 includes configuration management database (CMDB) web service 250, scheduler web service 260, hosted template user interface 258, and scheduler parser 264. CMDB web service includes CMDB parser 254 and data collection/polling module 256. Scheduler web service 260 includes scheduler service 262 and client service 268. Database 270 includes configuration management database 280 and scheduler database 285. Configuration management database 280 includes templates 282.

Client 200 may schedule data collection for task programs 214 through a user interface. In one embodiment, the user interface is a client side user interface application 202 that is stored locally on client 200 for execution. In another embodiment, the user interface is a server side user interface that is hosted by scheduler web service 260. For this example, user interface application 202 is a web-browser type of application that cooperates with client service 268 through a network connection. In still another embodiment, the user interface may be a web interface that downloads the user interface to client 200 when client 200 requests the user interface.

Information about the task program execution schedule is sent from client 200 to database 285 via scheduler service 262. Scheduler 210 polls scheduler database 285 through scheduler service 262. In one embodiment, the task program is scheduled for data collection in a specific domain such that only schedulers in the specified domain receive the task program schedule information. In another embodiment, task programs in multiple domains are scheduled for data collection. Each scheduler 210 is arranged to initiate program execution at a scheduled time in accordance with entries in scheduler database 285.

Scheduler web service 260 is arranged to receive client scheduling requests. Each scheduled event in scheduler database 285 may have one or more corresponding entries in the configuration management database that includes data collected/processed from target 292 during a previous or current execution of the task program.

Scheduler web service 260 is arranged to receive and respond to scheduling requests from clients and/or scheduler 210. In one example, a client requests entry of execution for a new task that is parsed and added to scheduler database 285. In another example, a client requests entry of execution of another new task that conflicts with one or more previous entries in scheduler database 285 and scheduler web service 260 returns an error message to client 200. In still another example, client 200 requests entry of execution of still another new task that overrides one or more previous entries in scheduler database 285. In yet another example, a client requests entry of execution of yet still another new task that conflicts with one or more previous entries in scheduler database 285 and scheduler web service 260 provides a user interface for editing the entries.

In one example, task program 214 may specify an output folder location for the requested data to be stored on database 285 via scheduler 210 with an associated file name. The output file is subsequently processed by output parser 212 to provide appropriately formatted data for service 240.

Output parser 212 is triggered by scheduler 210 when the requested data is received by service 240. Output parser 212 processes the requested data by converting the data into a format that may be easily communicated by CMDB web service 250 to database 270. In one embodiment, output parser 212 converts the data into a delimited text format such as an extensible markup language (XML). Data collected from different task programs is converted into a uniform format that is understood by configuration management database 280. In one embodiment, output parser 212 converts one data format to another format based on input from client 200.

CMDB web service 250 receives the parsed data from output parser 212 and stores the parsed data in configuration management database 280. In one embodiment, the data is stored in tables corresponding to data type. Examples of the types of data include metabase entries, share permissions, hot fix information, registry entries and allowed users. Configuration management database 280 is a central database for data collected by task programs 214. In one embodiment, the data collected during the execution of a particular task program is stored separately. CMDB web service 250 allows auditing tools to communicate with configuration management database 262 and access the stored data.

Data related to a specific task program execution and stored in configuration management database 280 may be referred to as a job run. Client 200 may access a job run in configuration management database 280 through CMDB web service 250.

Templates 282 are used for analyzing the data collected during execution of a task program. Templates 282 are configured to provide rules and guidelines for filtering and presenting collected data. In one example, the rules provide a simple basis for acceptable behavior resulting from task program execution (e.g., success or failure of a patch install, security rating for a security test, etc). Client 200 establishes the rules for a template and submits the template to CMDB web service 250. CMDB parser 254 is also arranged to process each template and store the template in configuration management database 280.

Client 200 may be arranged to cooperate with service 240 to define the rules for a template using Boolean operators (e.g., AND, OR, NAND, NOR, etc.). Multiple Boolean relationships may be combined to define a rule. Data that is collected during a job run is evaluated by each rule in the corresponding template. A determination is made whether an item associated with the collected data passed or failed with respect to the rules outlined in the template.

Configuration management database 280 can be queried based on customized input from client 200 to retrieve the data collected from a job run. The data may be retrieved from data collection/polling module 256. The template corresponding to the collected data may also be retrieved from configuration management database 280. In one example, the template is stored on CMDB web service 250 for evaluation of incoming data from task program 214. In another example, the template is defined as part of configuration management database 280 such that the rules are applied to collected data in response to queries from client 200 via service 240.

Client 200 may submit/edit templates through a user interface. In one embodiment, the user interface is a client side user interface application 202 that is stored locally on client 200 for execution. In another embodiment, the user interface is a server side user interface such as hosted template user interface 258. For this example, user interface application 202 is a web-browser type of application that cooperates with hosted template user interface 258 through a network connection. In still another embodiment, the user interface may be a web interface that downloads the user interface for template editing and/or submission to client 200 when requested by client 200. Similarly, client 200 may review reports through a user interface that may reside locally on client 200, hosted by CMDB web service 250, or downloaded from CMDB web service 250.

The collected data is compared to the corresponding template to evaluate task program results. In response to the comparison, client 200 is notified through CMDB web service 250 whether the data run passed or failed with respect to expected results. In one embodiment, the collected data is grouped together in a table based on the selected templates. If all the rules pass for a given template then target 292 is functioning properly with regard to the executed task program. If all the rules do not pass, the table includes detailed information about which specific rules and comparisons in the template failed or succeeded.

Client 200 may request a customized report that identifies detailed information associated with template evaluation. For example, collected data can be filtered and formatted according to the rule set associated with the template. The report is selected by reviewing a specific job run and the corresponding data. Client 200 selects a template from configuration management database 280 to generate the corresponding report. For any given job run, several different templates may be available in configuration management database 280 such that various aspects of each data collection can be viewed as may be desired.

Report requests are sent from client 200 to CMDB web service 250. CMDB web service 250 submits the template to configuration management database 280 for evaluation. Configuration management database 280 runs the rules to evaluate the template.

CMDB web service 250 is arranged to receive and respond to report requests and template submissions from clients. In one example, a client requests entry of a new template that is parsed and added to configuration management database 280. In another example, a client requests retrieval of template from configuration management database 280 for editing. In still another example, a client requests a report from a job run using a previously defined template in configuration management database 280.

A given template may be evaluated more than once such that changes to the results from task programs may be evaluated over time. For example, a template may be arranged to check for a hot fix. The job is run and the results are audited. The results that are viewed are the actual audit results from auditing the target servers. The template determines whether the hot fix is included on a group of servers. A patch deployment may be scheduled to install the hot fix on the servers that were previously evaluated as not having the hot fix. A week later another audit may be run using the same template to verify any changes since the previous audit. Multiple result templates may be used to report on different aspects of the same set of audit result data.

Figure 4:
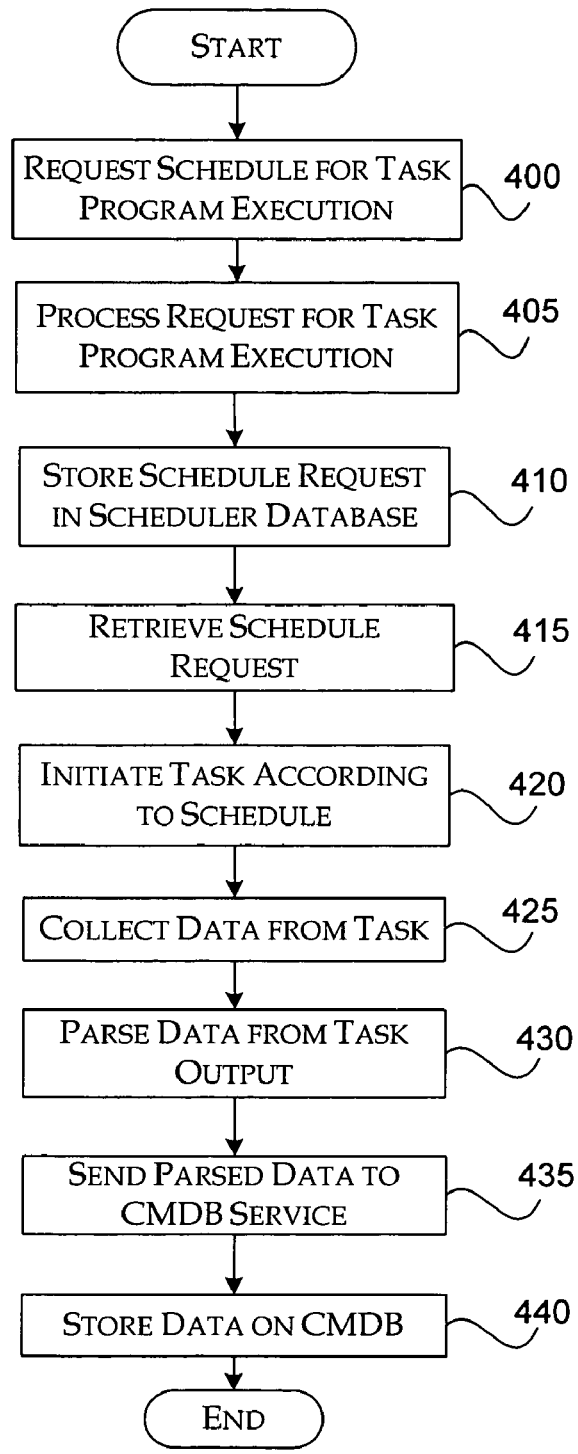
FIG. 4 is a logic flow diagram illustrating a process for scheduling the execution of applications, in accordance with the present invention.

FIG. 4 is a logic flow diagram illustrating a process for scheduling the execution of applications. The process begins at block 400 where the client requests a schedule for task program execution through a user interface.

Continuing to block 405, the scheduler web service processes the request for task program execution. The request is parsed such that the parsed data may be stored in the scheduler database. Moving to block 410, the parsed schedule request is stored in the scheduler database. Proceeding to block 415, the scheduler retrieves the schedule request by polling the scheduler database via the scheduler web service.

Advancing to block 420, the task is initiated according to the schedule. The schedule may be event triggered. For example, the event may trigger at a specified time and date. Alternatively, the event may trigger when an action is completed, such as when a specified user logs on to the network. Continuing to block 425, data is collected from the output of the executed task program.

Moving to block 430, the data collected from the task program is parsed. The output parser processes the collected data and converts the data into a format that may be easily communicated by the CMDB web service to the configuration management database. Proceeding to block 435, the parsed data is sent to the CMDB web service. Continuing to block 440, the data is stored in the configuration management database to determine whether the task program was successfully executed. The process then terminates at an end block.

Figure 5:
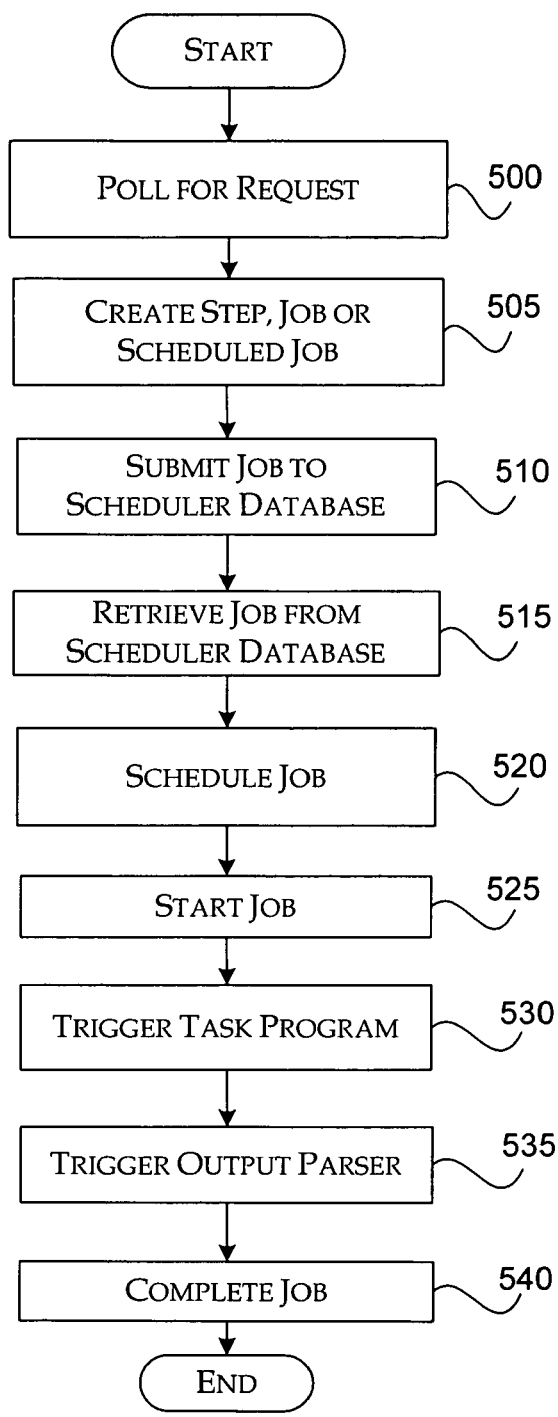
FIG. 5 is a logic flow diagram illustrating a process for scheduling the execution of applications, in accordance with the present invention.

FIG. 5 is a logic flow diagram illustrating a process for scheduling the execution of applications. The process begins at block 500 where the scheduler polls the scheduler database for a request to schedule the execution of a task program. The scheduler contacts the scheduler service to determine if a job was submitted by a user. If a job was submitted, the job is retrieved, analyzed and forwarded to a working queue.

Continuing to block 505, the user creates a step, a job or a scheduled job from a user interface. When creating a job, the user may retrieve an existing job and rerun the retrieved job at a scheduled time. The user may compose a new job if existing jobs do not address the user's requirements. A new job may be composed by selecting existing steps. If a required step does not exist, a new step may be created for the job to meet the user's requirements.

Moving to block 510, the user interface submits the job to the scheduler database through the scheduler web service. The job is converted into a format that the scheduler recognizes. For example, the user may scan different domains during the same step of the job. Thus, the step is separated into multiple jobs corresponding to the scheduler in each domain.

Proceeding to block 515, the scheduler retrieves the job from the scheduler database through the scheduler service using a poll function. The scheduler in a given domain retrieves scheduled jobs belonging to the domain. The scheduler wraps the retrieved data based on information provided by a maintenance function. The wrapped data is then forwarded to a working queue. If the poll function is not operating properly (e.g., a network problem), the poll function is placed on hold. Once the operating problem is resolved by the maintenance function, the poll function resumes and data continues to be retrieved.

Advancing to block 520, the job is scheduled. An implementation function retrieves the wrapped data from the working queue, and sets a timer based on user requests. The user locates the scheduled job using the user interface. In one embodiment, the user may cancel the job before the scheduled time. The poll function forwards a cancel command to the working queue. The implementation function cancels the time set for the job when the cancel command is detected.

Continuing to block 525, the scheduler starts the job at the scheduled time. The implementation function triggers the job run by opening the job and accessing the steps that comprise the job. The steps may include parser steps and task program steps. For example, a job may contain more than one task program. The scheduler reorganizes the steps so that the output of each task program is parsed after execution of the task program is complete.

Moving to block 530, the task program is triggered. The scheduler may create multiple processes to run the task program at each step.

Proceeding to block 535, the output parser is triggered. The scheduler triggers multiple processes to run the parser at each parser step. The parser process the output data of the task programs and submits the results through the parser web service.

Continuing to block 540, the scheduler completes the job. The status of the job is updated. In one embodiment, the scheduler schedules a new job if the job's attribute is recurring. The scheduler continues polling for new requests. The process then terminates at an end block.

Figure 6:
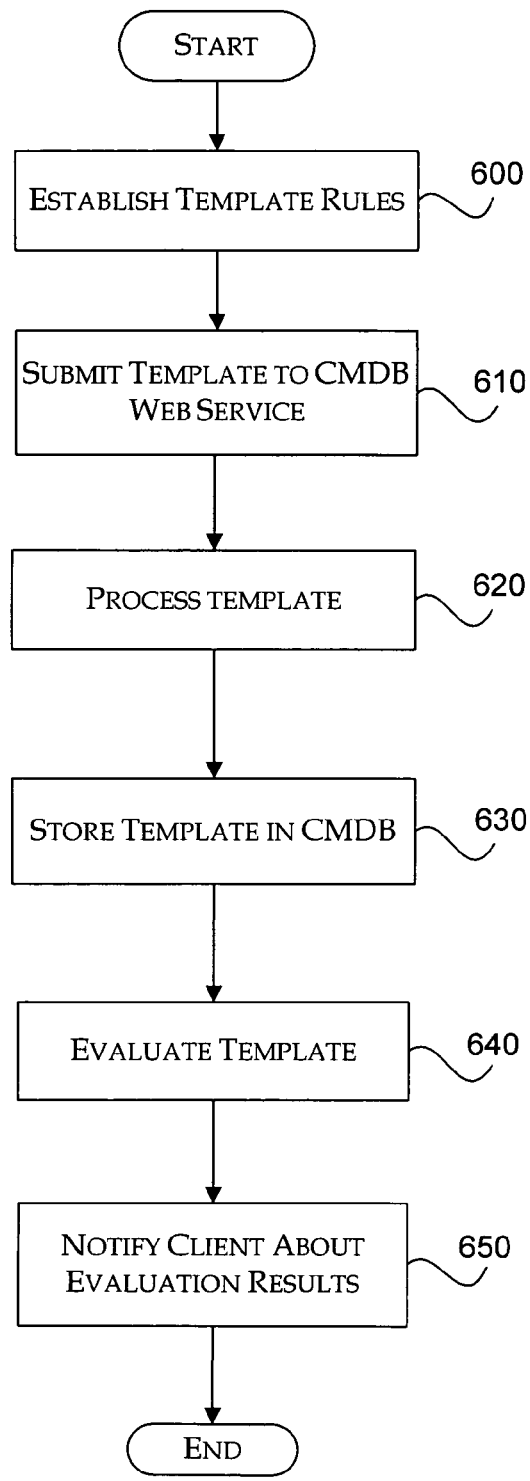
FIG. 6 is a logic flow diagram illustrating a process for determining whether a task program pass or fail with regard to template rules, in accordance with the present invention.

FIG. 6 is a logic flow diagram illustrating a process for determining whether a task program pass or fail with regard to template rules. The process begins at block 600 where a client establishes template rules for filtering and presenting collected data. In one example, the rules provide a model of acceptable behavior resulting from task program execution. In one embodiment, a template may be applied to the data collected during execution of more than one task program. Proceeding to block 610, the template is submitted to the CMDB web service. Moving to block 620, the CMDB web service processes the template.

Continuing to block 630, the template is stored in configuration management database. Advancing to block 640, the template is evaluated. The template is compared to the data collected during execution of the task program and stored in the configuration management database to determine whether the data run passed or failed with respect to expected results. In one embodiment, the template evaluation is performed "on-the-fly" when the client requests the report to allow for flexibility when running different result templates against different jobs. In another embodiment, the template evaluation is performed as a batch process where the results are stored in a database (e.g., the configuration management database). In another embodiment, the template evaluation is performed "on-the-fly" for the first request, and then stored in a database such that subsequent requests do not require reprocessing. Proceeding to block 650, the client is notified through the CMDB web service about the results of the template evaluation. In one embodiment, a table is output through the CMDB web service and displayed on the user interface to inform the client whether rules of the template passed or failed. The client may then determine any necessary changes to the network based on the results of the template evaluation. Processing terminates at an end block.

Figure 7:
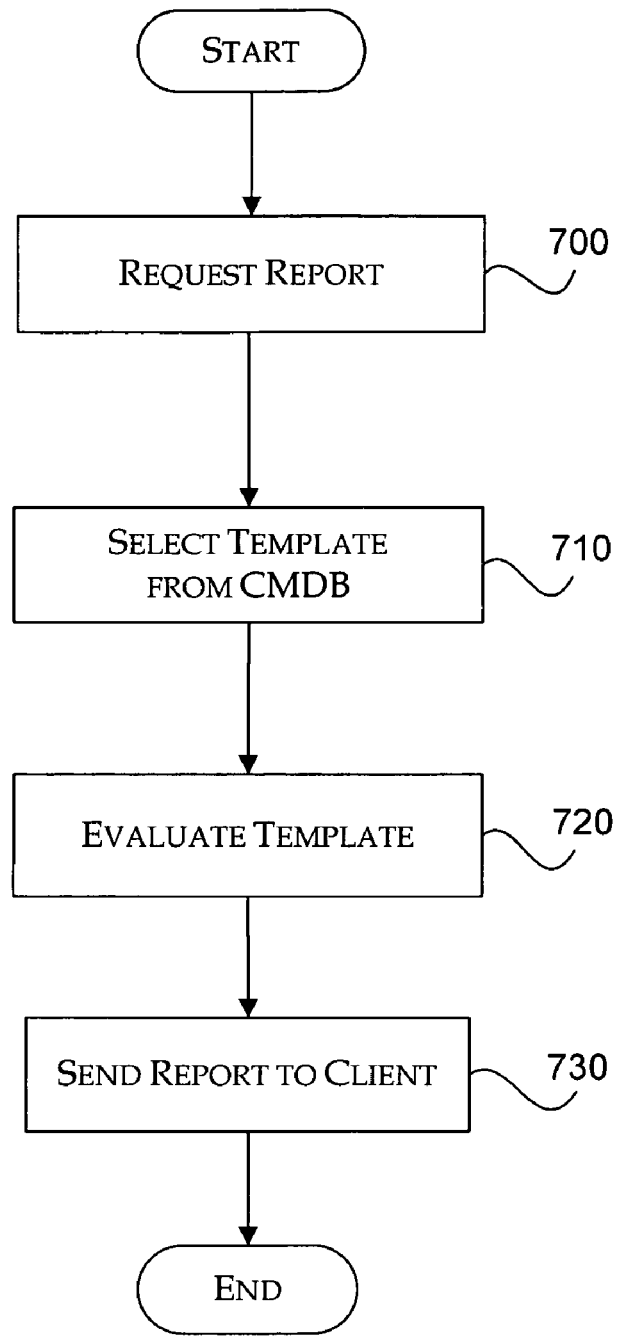
FIG. 7 is a logic flow diagram illustrating a process for reporting collected data, in accordance with the present invention.

FIG. 7 is a logic flow diagram illustrating a process for reporting data collected during execution of a task program. Processing begins at start block 700 where the client requests a report of the data associated with template evaluation. The client selects a report by reviewing a specific job run and the corresponding data.

Advancing to block 710, the client selects a template from the configuration management database to generate the corresponding report. Continuing to block 720, the template is evaluated at the configuration management database. In one embodiment, the configuration management database runs the rules to evaluate the template. Proceeding to block 730, the report is sent to the client. Processing then terminates at an end block.

It should be understood that the foregoing pertains only to the preferred embodiments of the present invention, and that numerous changes may be made to the embodiments described herein without departing from the spirit and scope of the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer system for scheduling the execution of applications, comprising:
   a processor; and
   a computer storage device storing computer-executable instruction, wherein the computer-executable instructions are configured for:
   submitting requests for scheduled execution of tasks, wherein the tasks are configured to audit network devices in a first and a second domain of a network;
   processing the requests in a service, wherein the service is in the computer storage device and in communication with the first and the second domain, wherein processing the request includes parsing the request to determine tasks associated with the first domain, parsing the request to determine tasks associated with the second domain, generating a first job from the tasks associated with the first domain, and generating a second job for tasks associated with the second domain;
   storing the first job in a scheduler database associated with the first domain and storing the second job in a scheduler database associated with the second domain;
   executing the first job on a scheduler of the first domain and executing the second job on a schedule of the second domain;
   collecting, at the service, data associated with the execution of the first job and the second job;
   comparing, at the service, the collected data from the first job to a first task template of a configuration management database by executing rules associated with the first task template to generate a status, wherein the rules provide a basis for determining whether the execution of tasks of the first job was successful;
   comparing, at the service, the collected data from the second job to a second task template of the configuration management database by executing rules associated with the second task template to generate a status, wherein the rules provide a basis for determining whether the execution of tasks of the second job was successful; and
   reporting the status of the first and second jobs to a client.

2. The system of claim 1, wherein the tasks include at least one of a group comprising: a software audit, software deployment, a software patch/update, account permissions settings, and a hardware audit.

3. The system of claim 1, wherein the scheduler executes the requests on a target, and wherein the target is at least one of a group comprising: a computing device, a client, a server, a router, a switch, and a network node.

4. The system of claim 1, wherein the interface is at least one of a group comprising: a client side user interface application that is stored locally on the client, a server side user interface hosted by the service, and a web interface that downloads a user interface to the client when requested.

5. The system of claim 1, wherein the execution of requests comprises collecting data from the output of the task.

6. The system of claim 1, wherein the scheduler is further arranged to:
   process the report status of requests; and
   provide the processed report status to the service for storage in the configuration management database.

7. The system of claim 1, further comprising another scheduler located in another domain.

8. The system of claim 1, wherein the client is located in the same domain as at least one of the tasks.

9. The system of claim 1, wherein the client is located in a different domain than at least one of the tasks.

10. A computer-implemented method for scheduling the execution of applications, comprising:
    submitting requests for scheduled execution of tasks, wherein the tasks are configured to audit network devices in a first and second domain of a network;
    processing the requests in a service, wherein the service is in a computer storage device and in communication with the first and the second domain, wherein processing the request includes parsing the request to determine tasks associated with the first domain, parsing the request to determine tasks associated with the second domain, generating a first job from the tasks associated with the first domain, and generating a second job for tasks associated with the second domain;
    storing the first job in a scheduler database associated with the first domain and storing the second job in a scheduler database associated with the second domain;
    executing the first job on a scheduler of the first domain and executing the second job on a schedule of the second domain;
    collecting, at the service, data associated with the execution of the first job and the second job;
    comparing, at the service, the collected data from the first job to a first task template of a configuration management database by executing rules associated with the first task template to generate a status, wherein the rules provide a basis for determining whether the execution of tasks of the first job was successful;
    comparing, at the service, the collected data from the second job to a second task template of the configuration management database by executing rules associated with the second task template to generate a status, wherein the rules provide a basis for determining whether the execution of tasks of the second job was successful; and reporting the status of the first and second jobs to a client.

11. The method of claim 10, further comprising sending the requests to a scheduler.

12. The method of claim 10, wherein executing the first and second jobs further comprises executing the requests when an event occurs.

13. The method of claim 10, further comprising polling the service for the requests.

14. A computer-readable storage medium storing computer executable instructions for scheduling the execution of applications, comprising:

submitting requests for scheduled execution of tasks, wherein the tasks are configured to audit network devices in a first and second domain of a network;

processing the requests in a service, wherein the service is in a computer storage device and in communication with the first and the second domain, wherein processing the request includes parsing the request to determine tasks associated with the first domain, parsing the request to determine tasks associated with the second domain, generating a first job from the tasks associated with the first domain, and generating a second job for tasks associated with the second domain;

storing the first job in a scheduler database associated with the first domain and storing the second job in a scheduler database associated with the second domain;

executing the first job on a scheduler of the first domain and executing the second job on a schedule of the second domain;

collecting, at the service, data associated with the execution of the first job and the second job;

comparing, at the service, the collected data from the first job to a first task template of a configuration management database by executing rules associated with the first task template to generate a status, wherein the rules provide a basis for determining whether the execution of tasks of the first job was successful;

comparing, at the service, the collected data from the second job to a second task template of the configuration management database by executing rules associated with the second task template to generate a status, wherein the rules provide a basis for determining whether the execution of tasks of the second job was successful; and reporting the status of the first and second jobs to the configuration management database.

15. The computer-readable storage medium of claim 14, further comprising polling the service for the requests.

16. The computer-readable storage medium of claim 14, further comprising storing the collected data on a configuration management database.

* * * * *